US011975904B2

(12) United States Patent
Hoadley et al.

(10) Patent No.: US 11,975,904 B2
(45) Date of Patent: May 7, 2024

(54) PRESSURE RELIEF BLOW-OUT PLUGS AND RELATED PACKAGES

(71) Applicant: Owens-Brockway Glass Container Inc., Perrysburg, OH (US)

(72) Inventors: David Hoadley, Sylvania, OH (US); Trent Jones, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 18/108,880

(22) Filed: Feb. 13, 2023

(65) Prior Publication Data

US 2023/0192380 A1 Jun. 22, 2023

Related U.S. Application Data

(63) Continuation of application No. 17/366,135, filed on Jul. 2, 2021, now Pat. No. 11,591,151.

(51) Int. Cl.
*B65D 1/02* (2006.01)
*B65D 1/20* (2006.01)
(Continued)

(52) U.S. Cl.
CPC ........... *B65D 77/225* (2013.01); *B65D 1/023* (2013.01); *B65D 1/20* (2013.01); *B65D 51/1672* (2013.01);
(Continued)

(58) Field of Classification Search
CPC ........ B65D 77/225; B65D 1/023; B65D 1/20; B65D 51/1672; B65D 77/06; B65D 83/38;
(Continued)

(56) References Cited

U.S. PATENT DOCUMENTS 533,726 A * 2/1895 McBride .................. A61J 9/04 215/11.5
638,022 A 11/1899 Lemyre
(Continued)

FOREIGN PATENT DOCUMENTS

CN 2633778 U 8/2004
DE 275688 C 6/1914
(Continued)

OTHER PUBLICATIONS

International Search Report and Written Opinion, Int. Application No. PCT/US2022/035216, Int. Filing Date: Jun. 28, 2022, Applicant: Owens-Brockway Glass Container Inc., dated Dec. 8, 2023.

*Primary Examiner* — J. Gregory Pickett
*Assistant Examiner* — Abigail Elizabeth Guidry

(57) ABSTRACT

Pressure relief blow out plugs for a container are disclosed as well as methods of using the same. One disclosed method involves providing a glass container that comprises a base and a body extending away from the base. The base includes a wall that defines a pressure relief passage. The method also involves inserting a pressure relief blow out into the pressure relief passage to seal the passage. The plug comprises a first inboard flange extending radially outwardly from the plug body, a stem, and a second inboard flange extending radially outwardly from the plug body and being spaced apart from the first inboard flange by a stem. The first inboard flange includes a first outboard sealing surface that provides an axial seal against the wall of the base of the glass container, and the second inboard flange including a circumferentially interrupted outboard facing retention portion the defines vent gaps.

15 Claims, 6 Drawing Sheets

(51) Int. Cl.

| | |
|---|---|
| ***B65D 51/16*** | (2006.01) |
| ***B65D 77/06*** | (2006.01) |
| ***B65D 77/22*** | (2006.01) |
| ***B65D 83/38*** | (2006.01) |
| ***B65D 83/70*** | (2006.01) |
| ***B65D 85/72*** | (2006.01) |
| ***B67D 1/04*** | (2006.01) |
| ***B67D 1/12*** | (2006.01) |
| *B67D 1/08* | (2006.01) |

(52) U.S. Cl.
CPC ............. *B65D 77/06* (2013.01); *B65D 83/38* (2013.01); *B65D 83/70* (2013.01); *B65D 85/72* (2013.01); *B67D 1/045* (2013.01); *B67D 1/125* (2013.01); *B65D 2205/00* (2013.01); *B67D 2001/0822* (2013.01)

(58) Field of Classification Search
CPC .... B65D 83/70; B65D 85/72; B65D 2205/00; B65D 51/1644; B65D 51/1683; B65D 3383/75; B65D 47/2031; B65D 1/06; B65D 23/04; B65D 41/16; B65D 47/2025; B65D 81/2076; B65D 81/26; B65D 83/46; B67D 1/045; B67D 1/125; B67D 2001/0822; B67D 2001/0817; A47G 19/2272; B01D 11/0203; Y10T 137/7722; A61J 9/04; A61J 11/008; A61J 11/04; A61J 9/001; A61J 9/003
See application file for complete search history.

(56) References Cited

U.S. PATENT DOCUMENTS 1,147,629 A * 7/1915 Hatvany .................. B65D 1/06 215/2
1,694,754 A * 12/1928 Omer ....................... B65D 1/06 215/11.4
2,084,099 A * 6/1937 Maccoy .................... A61J 9/04 215/11.5
2,416,900 A * 3/1947 Busby ................ B65D 51/1683 220/254.1
2,766,408 A 10/1956 Georgiev et al.
2,933,102 A 4/1960 Hillman et al.
2,997,397 A 8/1961 Doulgheridis
3,134,514 A 5/1964 Booth
3,292,808 A * 12/1966 Greene ..................... A61J 9/04 215/11.5
3,380,621 A 4/1968 Rissberger, Jr. et al.
3,768,682 A * 10/1973 Meyers ..................... A61J 9/04 D24/197
4,828,126 A * 5/1989 Vincinguerra ............ A61J 9/04 215/11.1
5,357,909 A * 10/1994 Attinger ................. F01P 11/029 165/104.32
5,472,112 A * 12/1995 Maciejewski .......... B65D 23/00 222/545
5,535,900 A * 7/1996 Huang .................. B65B 31/047 137/526
5,607,074 A * 3/1997 De Gennaro ............. A61J 9/04 215/11.5
5,931,352 A * 8/1999 Dirr ................... B65D 47/2018 222/212
6,152,170 A 11/2000 Nouveau et al.
6,334,551 B1 * 1/2002 Taghavi-Khanghah ..................... B05B 11/3035 222/496
6,581,803 B1 * 6/2003 Yoshimoto ......... A46B 11/0041 222/481.5
7,048,136 B2 * 5/2006 Havens .............. B65D 51/1644 222/509
7,294,354 B2 11/2007 Gunter et al.
7,596,931 B2 10/2009 Gunter et al.
7,614,522 B2 * 11/2009 Hsu ....................... A47J 36/027 220/784
8,096,035 B2 * 1/2012 Kelly ..................... B65D 25/16 220/592.2
8,888,752 B2 * 11/2014 Cacka .................... A61H 35/04 604/514
9,661,859 B1 * 5/2017 Jones ....................... A22B 3/02
9,750,263 B1 * 9/2017 Jones ....................... A22B 3/02
10,377,521 B2 8/2019 Taruno et al.
10,427,821 B2 10/2019 Taruno et al.
10,464,721 B2 * 11/2019 Kim ....................... B65D 43/02
10,562,690 B2 * 2/2020 Plazarte ............. B65D 51/1683
2002/0166866 A1 11/2002 Egan
2005/0211319 A1 * 9/2005 Kobetsky ........... B65D 81/2038 137/854
2006/0226171 A1 * 10/2006 Sternberg ........... B65D 83/0055 222/95
2008/0128047 A1 * 6/2008 Billings ................. B65D 83/70 141/20
2008/0314933 A1 * 12/2008 Leonoff ................. B65D 23/00 222/215
2009/0152282 A1 6/2009 Lee
2012/0305607 A1 * 12/2012 Geiger ............... B65D 47/2025 264/255
2013/0068778 A1 * 3/2013 Griffiths ............. F01M 11/0408 220/601
2013/0112648 A1 * 5/2013 Cohen ..................... F16K 17/16 215/307
2014/0305947 A1 * 10/2014 Lee ......................... A47J 36/06 220/573.1
2016/0375608 A1 * 12/2016 Pijls ........................ B29B 11/14 215/370
2017/0183137 A1 6/2017 Walton et al.
2017/0197749 A1 7/2017 Eguchi
2018/0201417 A1 * 7/2018 Douvdevani ...... B65D 41/0407
2018/0370673 A1 12/2018 Taruno et al.
2019/0100344 A1 * 4/2019 Taruno ................. B65D 1/0215
2021/0024256 A1 * 1/2021 Lofy .................... B65D 47/122
2021/0300644 A1 * 9/2021 Hirdler .................. B65D 25/00

FOREIGN PATENT DOCUMENTS

DE 850984 9/1952
DE 935109 C 11/1955
EP 1900652 A1 3/2008
ES 2006251 A6 4/1989
FR 2769297 A1 4/1999
GB 514918 11/1939
GB 2289889 A 12/1995
JP 09142552 A 6/1997
JP 2016104644 A 6/2016
KR 101496238 B1 2/2015
WO WO9917999 A1 4/1999
WO 2008102964 8/2008
WO WO2020193503 A1 10/2020
WO WO2020262760 A1 12/2020

* cited by examiner

PRESSURE RELIEF BLOW-OUT PLUGS AND RELATED PACKAGES

TECHNICAL FIELD

This patent application discloses innovations to pressure relief plugs configured to vent containers when internal pressures inside the containers exceed a predetermined threshold.

BACKGROUND

Packages typically include a container to hold contents and a closure to close and open the container. In particular, beverage packages usually include a container having a top opening to receive a beverage during filling of the container and to dispense the beverage during use, and a closure fastenable to the container to close off and open up the top opening of the container. Some beverage packages may be internally pressurized and, thus, such packages also include pressure relief valves incorporated into walls of the containers to automatically vent to atmosphere when internal pressures of the containers exceed a predetermined threshold. Such packages often include pressure relief valve designs and/or container designs that are unnecessarily costly and/or complex.

SUMMARY OF THE DISCLOSURE

According to an embodiment of the present disclosure, a pressure relief blow-out plug includes a body including an inboard end and an outboard end, and a first inboard flange extending radially outwardly from the inboard end of the body and having an outboard sealing surface that is circumferentially continuous. The plug also includes a stem extending longitudinally away from the first inboard flange, and a second inboard flange extending radially away from the stem and longitudinally spaced apart from the first inboard flange. The second inboard flange has an outboard facing retention portion that is circumferentially interrupted to include circumferentially spaced bosses and vent gaps between the bosses.

According to another embodiment of the present disclosure, a pressure relief blow-out plug includes a body including an inboard end and an outboard end, an outboard head extending radially outwardly from the outboard end of the body, and an inboard flange extending radially outwardly from the inboard end of the body. The inboard flange includes an outboard surface and an inboard surface having a deformation weakening to facilitate deformation of the inboard flange.

According to additional embodiments of the present disclosure, packages include containers including walls having interior and exterior surfaces, and pressure relief passages extending along longitudinal passage axes and having circumferential passage surfaces extending through the walls between the interior and exterior surfaces. The pressure relief blow-out plugs are carried in the pressure relief passages.

DETAILED DESCRIPTION

The present disclosure is directed to pressure relief blow-out plugs, and packages including such plugs carried in walls of containers to permit controlled pressure releases in the event of over-pressurizations of the interiors of the containers. The presently disclosed blow-out plugs are much simpler in construction and operation than currently available pressure relief valves for containers and, thus, the presently disclosed packages are much simpler in construction and operation than currently available pressure-relieved packages.

Figure 1:
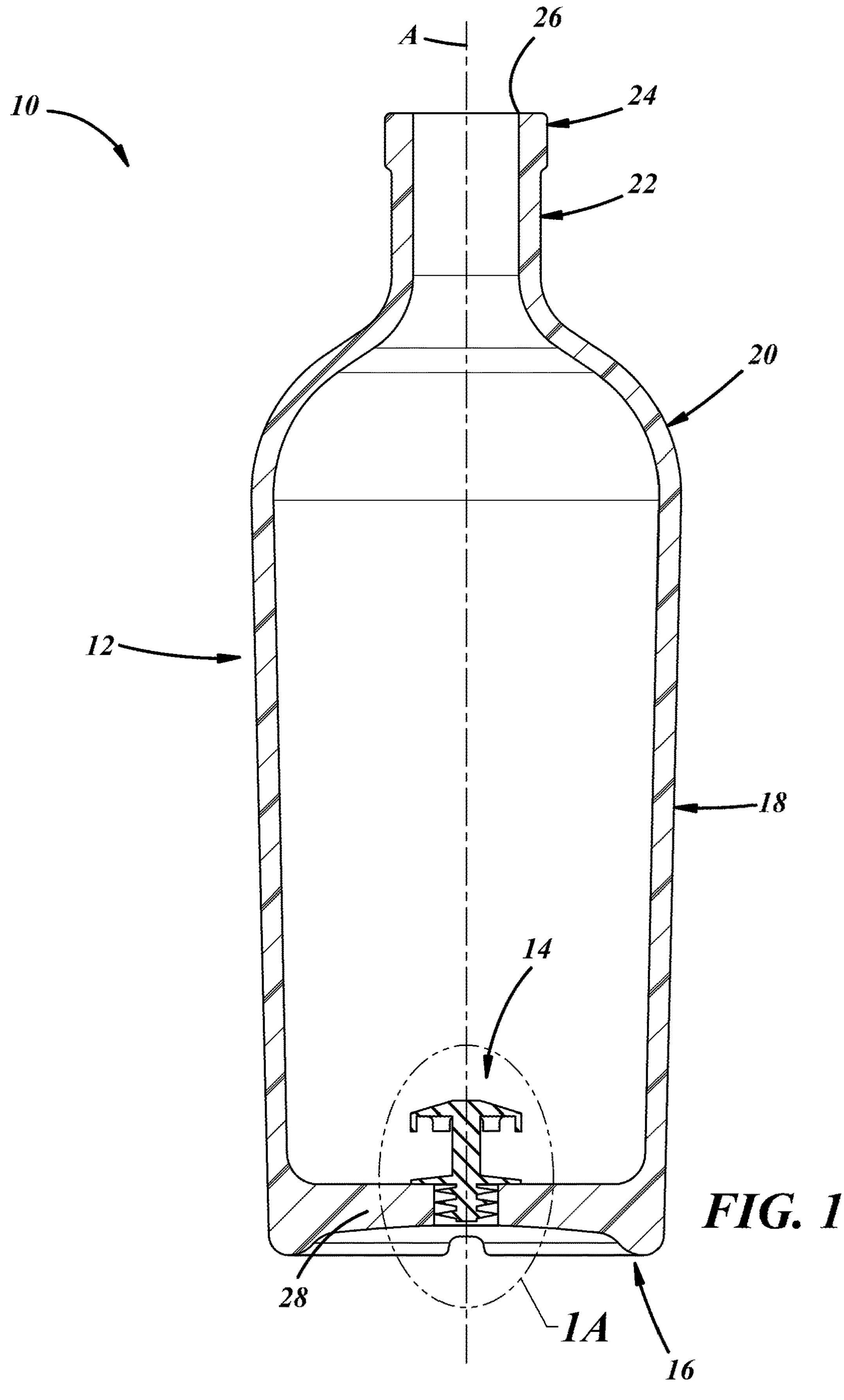
FIG. 1 is an elevational cross-sectional view of a package including a container and a pressure relief blow-out plug in accordance with an illustrative embodiment of the present disclosure.

With specific reference to the drawing figures, FIG. 1 shows an illustrative embodiment of a package 10 including a container 12 and a pressure relief blow-out plug 14. The pressure relief blow-out plug 14 is carried by the container 12 and, upon excess pressure in the interior of the container 12, is configured to be displaced to permit gas inside the container 12 to escape.

The illustrated container 12 is composed of glass, but the container 12 could be composed of plastic, metal, or any other material suitable for use with pressurized packaging. In any case, the illustrated container 12 includes a base 16, a body 18 extending away from the base 16, a shoulder 20 extending away from the body 18, and a neck 22 extending away from the shoulder 20 and terminating in a neck finish 24 having an open mouth 26 through which a longitudinal axis A of the container 12 extends. Although not illustrated, a liquid, for example, a beverage, may be introduced into the container 12 through the open mouth 26 and, although not shown, a closure may be coupled to the container 12 to close and seal the open mouth 26 so that the package 10 may be internally pressurized in any suitable manner. In the illustrated embodiment, the pressure relief blow-out plug 14 is carried in the base 16 of the container 12. In other embodiments, however, the plug 14 may be carried in the body 18, the shoulder 20, or even the neck 22 of the container 12.

Figure 1A:
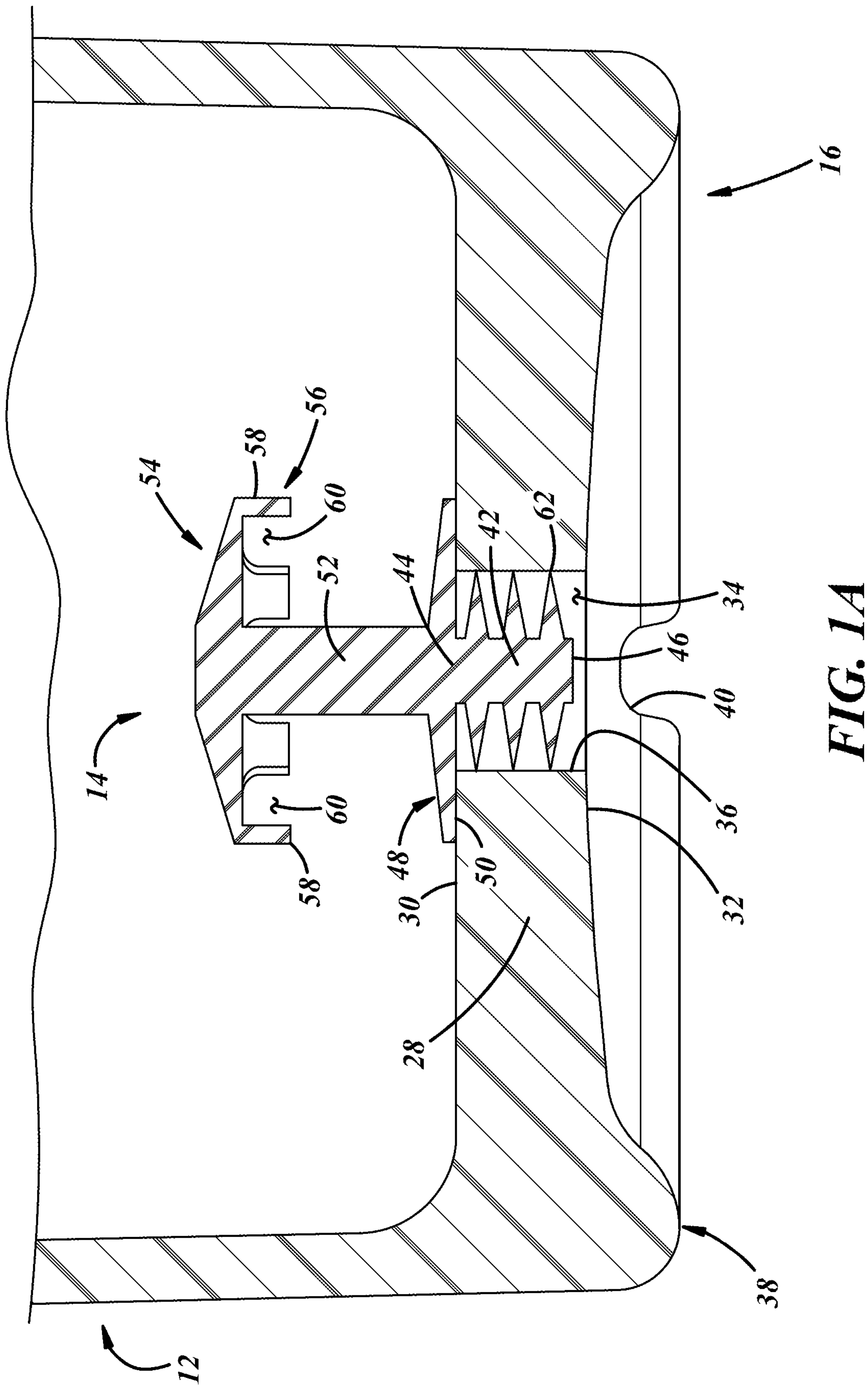
FIG. 1A is an enlarged, fragmentary, cross-sectional view of the package of FIG. 1, taken from circle 1A thereof.

With reference to FIG. 1A, the base 16 includes a wall 28 having an interior surface 30 and an exterior surface 32, and a pressure relief passage 34 extending along a longitudinal passage axis, which, in the illustrated embodiment is the same as the container axis A. In other embodiments, the passage axis may be transversely oriented with respect to the container axis A or parallel to and spaced apart from the container axis A. In any case, the passage 34 includes a circumferential passage surface 36 extending through the wall 28 between the interior and exterior surfaces 30, 32. The circumferential passage surface 36 may be of straight cylindrical shape, as shown in the embodiment illustrated in FIG. 1A. Also, the base 16 may include a heel 38 extending between the exterior surface 32 of the wall 28 and the body 18 and establishing a bottom surface of the container 12. Likewise, the base 16 may be punted such that the exterior surface 32 of the wall 28 is spaced upwardly away from the bottom surface established by the heel 38. Similarly, the base 16 may include at least one notch 40 in the bottom surface established by the heel 38. The pressure relief passage 34 is entirely or partially formed into the wall 28 of the container 12 during forming of the container 12, and/or may be, for example, hot-worked, drilled, laser ablated, or water cut, into the wall 28 after forming of the container 12.

With continued reference to FIG. 1A, the pressure relief blow-out plug 14 is configured to be carried in the pressure relief passage 34 of the container 12. The illustrated plug 14 is a unitary component composed of an elastomeric material, but the plug 14 also or instead could be composed of a thermoplastic material, and/or any other material(s) suitable for use as a pressure relief blow-out plug for pressurized packaging. In some embodiments, the plug 14 may be insert molded from a thermoplastic or thermoset core with over molded elastomeric seal portions. In any case, the pressure relief blow-out plug 14 includes a plug body 42 carried in the pressure relief passage 34 and having an inboard end 44 and an outboard end 46. The plug body 42 further includes a first inboard flange 48, a stem 52, and a second inboard flange 54. The first inboard flange 48 extends radially outwardly from the inboard end 44 and has a first outboard sealing surface 50 that is circumferentially continuous to provide an axial seal against the interior surface 30 of the wall 28 of the base 16 of the container 12 and surrounding the passage 34. The stem 52 extends longitudinally away from the first inboard flange 48 and has a maximum outer diameter less than the inner diameter of the pressure relief passage 34, and less than the major outer diameters of the flanges 48, 54. The second inboard flange 54, which extends radially away from the stem 52 and is longitudinally spaced apart from the first inboard flange 48, has an outboard facing retention portion 56 that is circumferentially interrupted to include circumferentially spaced bosses 58 and vent gaps 60 between the bosses 58. The flanges 48, 54 may be umbrella shaped, with outer diameters greater than the inner diameter of the passage 34. The plug 14 may be applied to the container 12 either by pushing the plug 14 into the passage 34 from outside of the container 12, or by pushing the plug 14 into the passage 34 from inside of the container 12, for example, through the open mouth 26 and down into the passage 34.

Figure 2:
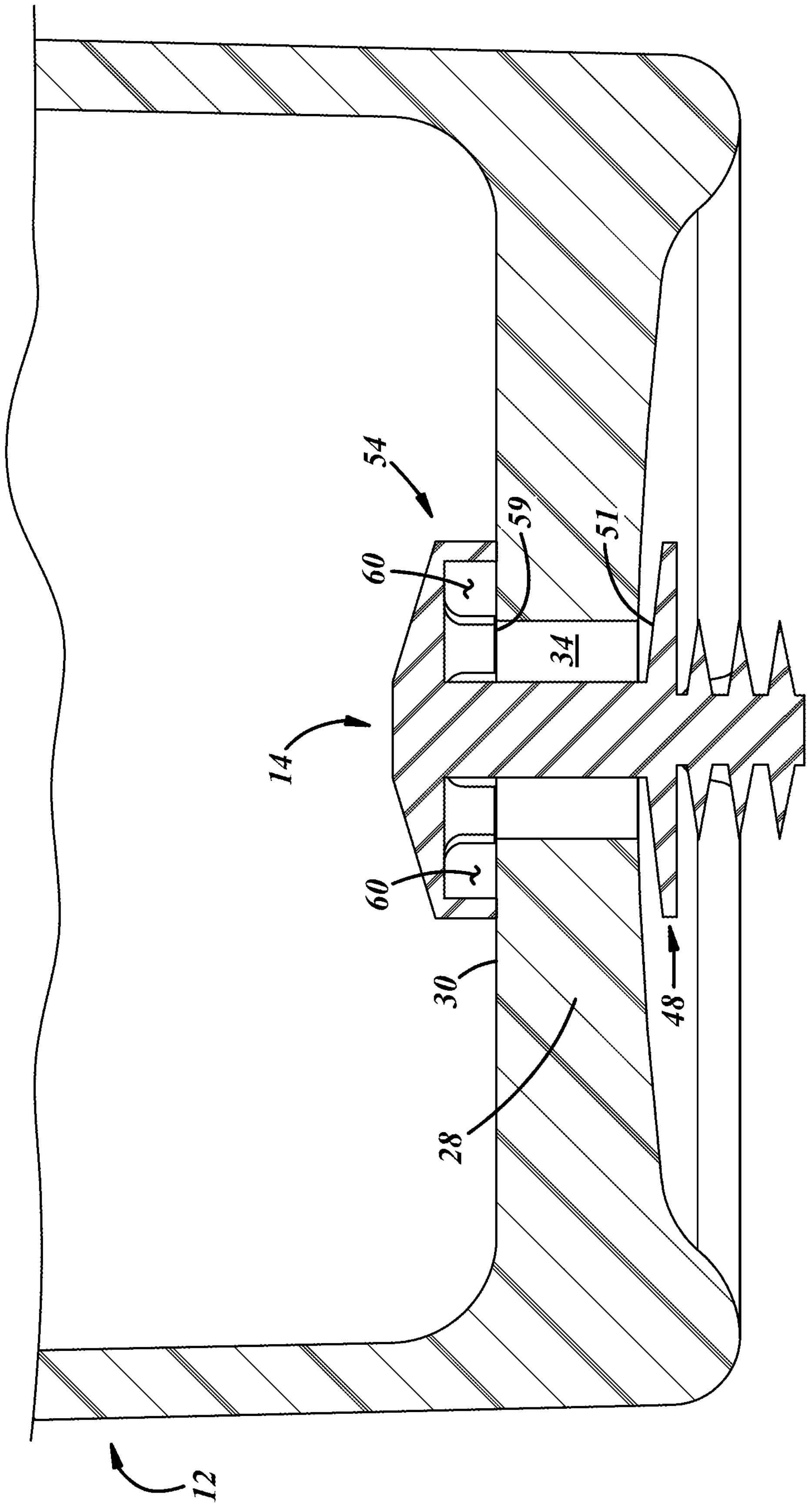
FIG. 2 is an enlarged, fragmentary, cross-sectional view of the package of FIG. 1, illustrating the pressure relief blow-out plug in an ejected position.

As illustrated in FIG. 1A, the first inboard flange 48 is in sealing contact with the interior surface 30 of the wall 28 of the container 12. But, as illustrated in FIG. 2, upon excess pressure within the container 12, the pressure relief blow-out plug 14 is configured to be displaced such that the first inboard flange 48 is pushed through the pressure relief passage 34 and the second inboard flange 54 contacts the interior surface 30 of the wall 28 of the container 12 to retain the plug 14 to the container 12. Accordingly, gas inside the container 12 is permitted to escape between the second inboard flange 54 and the wall 28 of the container 12 via the vent gaps 60 in the second inboard flange 54. Likewise, the notch 40 (FIG. 1A) in the heel 38 of the base 16 of the container further 12 facilitates escape of the gas away from the container 12. Also, the plug 14 may be configured such that a distance between an inboard surface 51 of the first inboard flange 48 and an undersurface 59 of the second inboard flange 54 is greater than the thickness of the wall 28 at the pressure relief passage 34.

The plug 14 is not ejected through the passage 34 because the second inboard flange 54 contacts the interior surface 30 of the wall 28 to retain the plug 14 against the wall 28 in the container 12. In other words, the second inboard flange 54 provides a physical barrier to prevent the plug 14 from completely ejecting while still allowing enough of an opening via the passage 34 to adequately vent pressure in a timely manner. In some embodiments, the plug 14 may be composed of a material and/or construction that permanently deforms as the plug 14 is forced through the passage 34, rather than being composed and/or constructed in a manner that would allow the plug 14 to return to shape.

With reference again to FIG. 1A, the pressure relief blow-out plug 14 need not include a head extending away from the outboard end 46 of the plug body 42 and contacting the exterior surface 32 of the wall 28 of the container 12. Also, the plug body 42 may have an outer diameter greater than the inner diameter of the circumferential passage surface 36 of the pressure relief passage 34, such that the plug body 42 may be interference fit to the pressure relief passage 34. In the illustrated embodiment, the outboard end 46 of the plug body 42 is recessed with respect to the exterior surface 32 of the wall 28 but, in other embodiments, the outboard end 46 may extend outwardly of the container 12 beyond the exterior surface 32 of the wall 28. Also, the plug body 42 may have at least one external rib 62 contacting the circumferential passage surface 36 of the pressure relief passage 34. In the illustrated embodiment, the plug body 42 has three, axially spaced, circumferentially continuous, external ribs 62.

Figure 3:
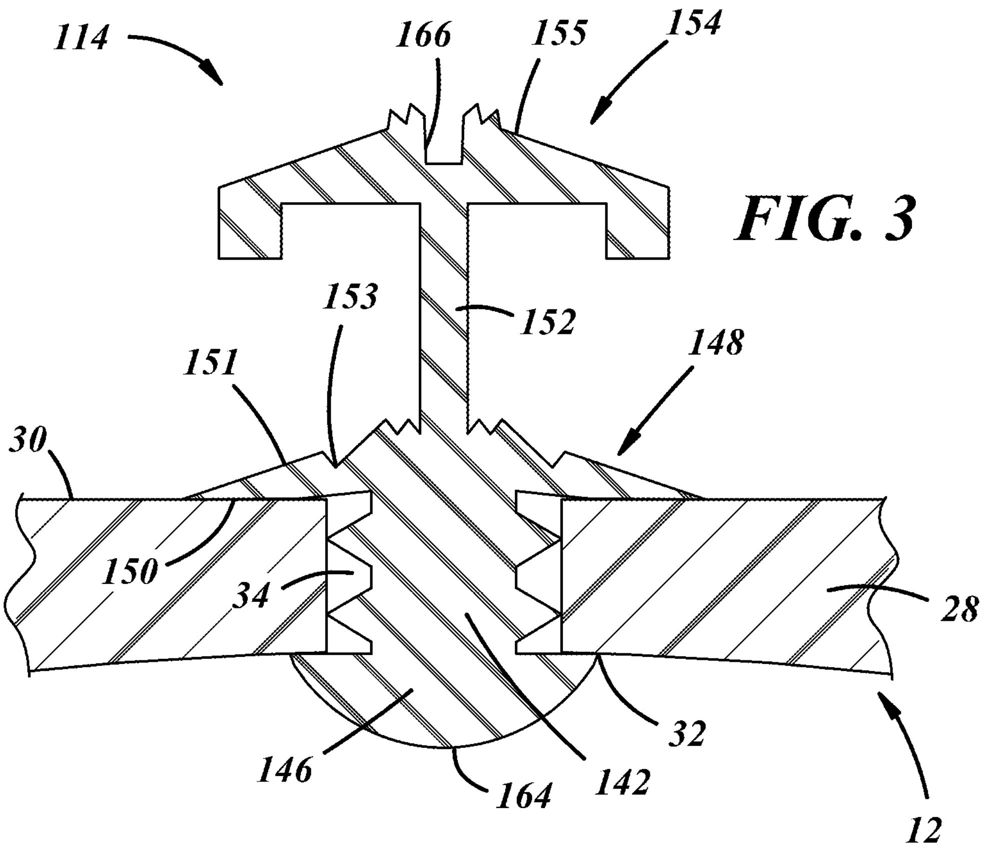
FIG. 3 is a fragmentary cross-sectional view of a package including a container and a pressure relief blow-out plug in accordance with another illustrative embodiment of the present disclosure.
Figure 4:
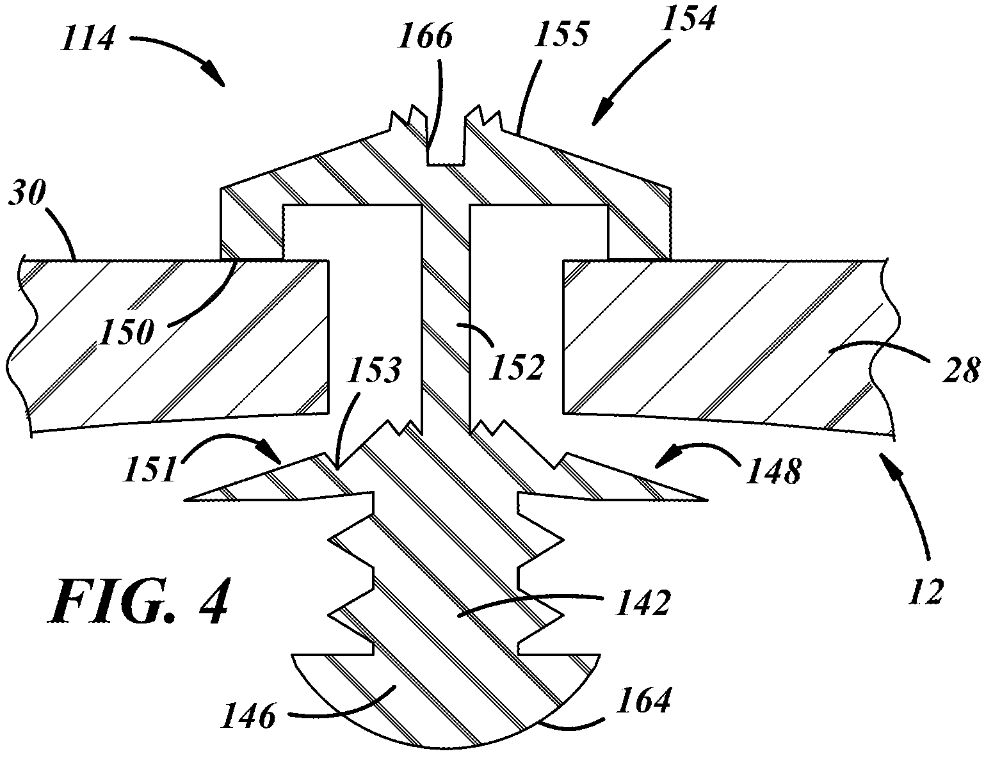
FIG. 4 is a fragmentary cross-sectional view of the package of FIG. 3, illustrating the pressure relief blow-out plug in an ejected position.

FIGS. 3 and 4 show another illustrative embodiment of a pressure relief blow-out plug 114. This embodiment is similar in many respects to the embodiment of FIGS. 1 and 2 and like numerals among the embodiments generally designate like or corresponding elements throughout the several views of the drawing figures. Accordingly, the descriptions of the embodiments are incorporated into one another, and description of subject matter common to the embodiments generally may not be repeated here.

In this embodiment, the plug 114 includes a body 142, and an outboard head 164 extending away from an outboard end 146 of the body 142 and contacting the exterior surface 32 of the wall 28 of the container 12. The plug 114 also includes a first inboard flange 148 including a first outboard surface 150 in contact with the interior surface 30 of the wall 28 of the container 12, and a first inboard surface 151 having a deformation weakening 153 to facilitate deformation of the first inboard flange 148 and passage through the pressure relief passage 34. In the illustrated embodiment, the deformation weakening 153 is a notch, but in other embodiments, the deformation weakening 153 may be a thinned wall, a semi-perforated wall, or the like. In any case, the deformation weakening 153 may extend circumferentially and may have a diameter less than the inner diameter of the passage 34. The first inboard surface 151 may be surface-textured to promote nucleation of liquid in the container. Similarly, the plug 114 also includes a stem 152 extending away from the first inboard flange 148, and a second inboard flange 154 that includes a second inboard surface 155 being surface-textured to promote nucleation of liquid in the container 12. In an example, such surface texturing may include sharp features, for example, serrations, V-shaped ridges, and/or the like, that enable gas dissolved in liquid to begin separation. The surface texturing may be characterized as rough texture, as distinct from a comparatively smooth texture adjacent to the surface texturing.

The second inboard flange 154 and/or the stem 152 may include an engagement feature 166 to facilitate insertion of the plug 14 into the pressure relief passage 34. In the illustrated embodiment, the engagement feature 166 includes a straight slot, which may accommodate a screwdriver-like blade of a tool (not shown) that may engage the slot via an interference fit to facilitate carrying the plug 114 by the tool and insertion of the plug 114 into the pressure relief passage 34. In other embodiments, the engagement feature 166 may include a blind hole, which may be circular, hexagonal, or of any other suitable shape for engaging an insertion tool, or any other engagement feature suitable for use with a blow-out plug.

Figure 5:
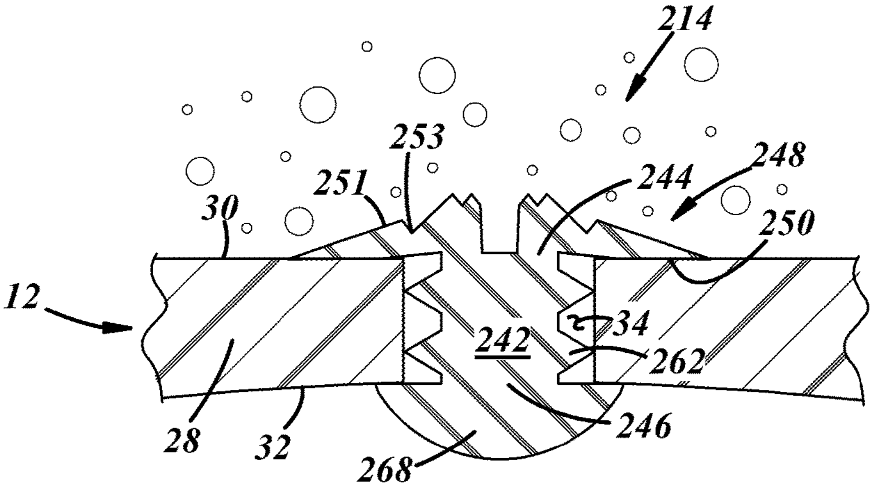
FIG. 5 is a fragmentary cross-sectional view of a package including a container and a pressure relief blow-out plug in accordance with an additional illustrative embodiment of the present disclosure.
Figure 6:
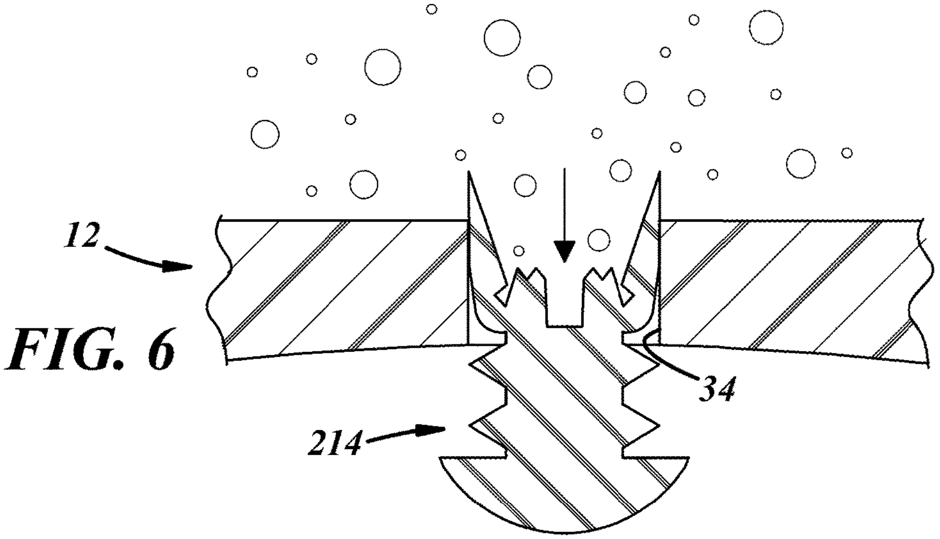
FIG. 6 is a fragmentary cross-sectional view of the package of FIG. 5, illustrating the pressure relief blow-out plug in an intermediate ejection position.
Figure 7:
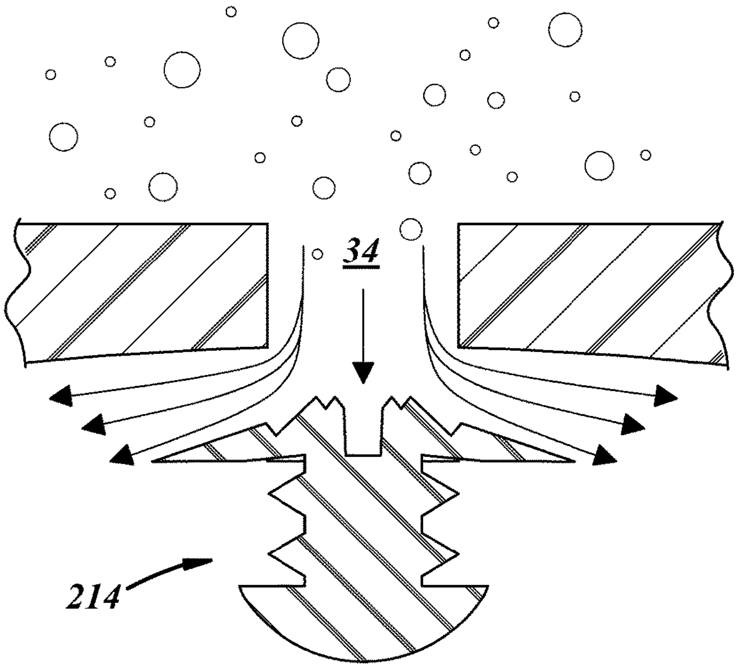
FIG. 7 is a fragmentary cross-sectional view of the package of FIG. 5, illustrating the pressure relief blow-out plug in an ejected position.

FIGS. 5 through 7 show another illustrative embodiment of a pressure relief blow-out plug 214. This embodiment is similar in many respects to the embodiments of FIGS. 1 through 4 and like numerals among the embodiments generally designate like or corresponding elements throughout the several views of the drawing figures. Accordingly, the descriptions of the embodiments are incorporated into one another, and description of subject matter common to the embodiments generally may not be repeated here.

With reference to FIG. 5, the pressure relief blow-out plug 214 omits the retention features disclosed with respect to FIGS. 1 through 4, such that the plug 214 will be ejected from the container 12 once the pressure inside the container 12 exceeds a predetermined threshold. The pressure relief blow-out plug 214 includes a body 242 carried in the pressure relief passage 34 and having an inboard end 244 and an outboard end 246, an outboard head 268 extending radially outwardly from the outboard end 246 of the body 242, and an inboard flange 248 extending radially outwardly from the inboard end 244 of the body 242 and including an outboard surface 250, and an inboard surface 251 having a deformation weakening 253 to facilitate deformation of the inboard flange 248. The outboard head 268 has a maximum outer diameter than is smaller than a maximum outer diameter of the inboard flange 248. The inboard surface 251 of the inboard flange 248 is surface-textured to promote nucleation of liquid in the container 12. The pressure relief blow-out plug 214 is carried in the pressure relief passage 34 of the container 12, wherein the outboard head 268 is in contact with the exterior surface 32 of the wall 28 of the container 12 and the inboard flange 248 is in contact with the interior surface 30 of the wall 28 of the container 12. The body 242 of the pressure relief blow-out plug 214 has at least one external rib 262 contacting the circumferential passage surface 36 of the pressure relief passage 224.

With reference to FIGS. 6 and 7, upon excess pressure within the container 12, the pressure relief blow-out plug 214 is displaced through and out of the pressure relief passage 34, wherein the inboard flange 248 folds at the deformation weakening 253 to facilitate ejection of the plug 214 from the container 12. In other words, the plug 216 is effectively ejected from the container 12 and is not retained thereto.

Figure 8:
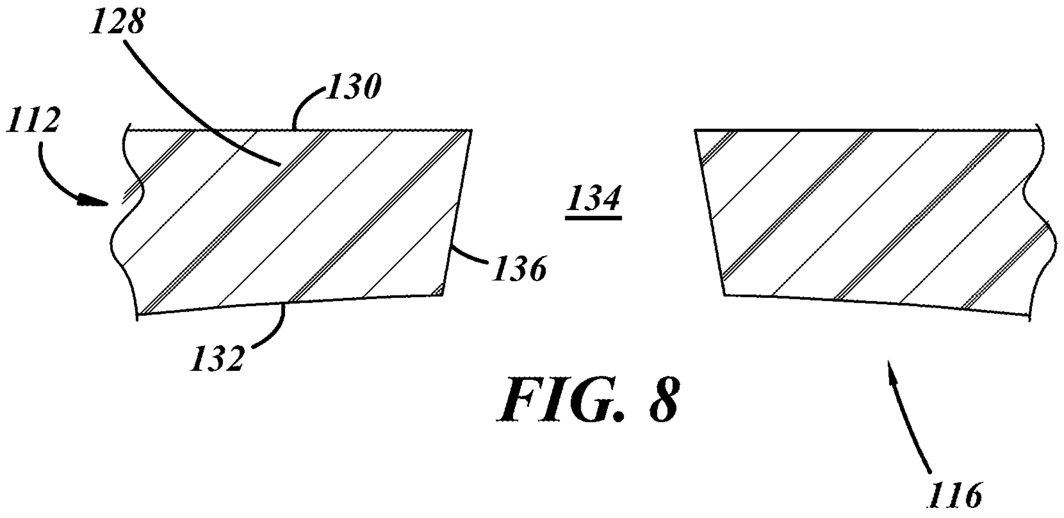
FIG. 8 is a fragmentary, schematic, cross-sectional view of another embodiment of a bottle that may be used with the packages of FIGS. 1-7.
Figure 9:
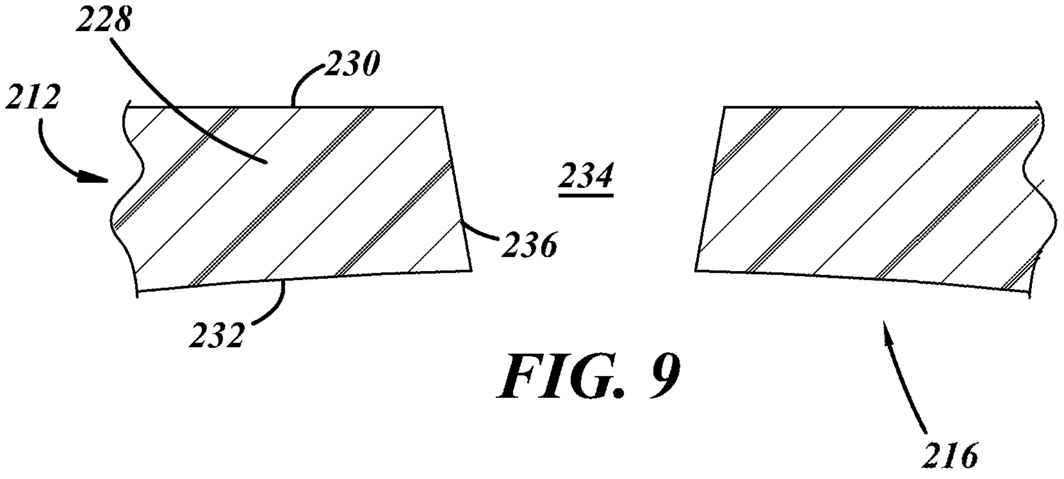
FIG. 9 is a fragmentary, schematic, cross-sectional view of an additional embodiment of a bottle that may be used with the packages of FIGS. 1-7.

FIGS. 8 and 9 show additional illustrative embodiments of bottles 112, 212 usable with the embodiments of FIGS. 1-7. These embodiments are similar in many respects to the embodiments of FIGS. 1 through 7 and like numerals among the embodiments generally designate like or corresponding elements throughout the several views of the drawing figures. Accordingly, the descriptions of the embodiments are incorporated into one another, and description of subject matter common to the embodiments generally may not be repeated here.

A first bottle 112 includes a base 116 including a wall 128 having an interior surface 130 and an exterior surface 132, and a pressure relief passage 134 that extends through the wall 128 and is tapered. The pressure relief passage 134 is tapered so that the passage 134 increases in size (e.g. diameter or maximum width) along an axial direction extending from the interior surface 130 of the wall 128 to the exterior surface 132 of the wall 128. The tapered passage 134 may be provided to facilitate outward displacement of a pressure relief blow-out plug (not shown) relative to the base 116, upon excess pressure within the bottle 112. More specifically, upon excess pressure within the bottle 112, the tapered passage 134 may permit a body of the plug to progressively relax so that the plug can be more easily ejected from, or displaced with respect to, the wall 128 of the base 116. Even more specifically, the fit between the outer diameter of the plug body and the inner diameter of the tapered pressure relief passage 134 becomes progressively looser as the plug body moves through the passage 134. Accordingly, this configuration may promote quick pressure relief and facilitate consistent performance of plug ejection or displacement, to minimize instances of the plug body becoming stuck or snagged within the base 116.

A second bottle 212 includes a base 216 including a wall 228 having an interior surface 230 and an exterior surface 232, and a pressure relief passage 234 that extends through the wall 228 and is reverse-tapered. The passage 234 is reverse-tapered so that the passage 234 decreases in size (e.g. diameter or maximum width) along an axial direction extending from the interior surface 230 of the wall 228 to the exterior surface 232 of the wall 228. The reverse-tapered passage 234 may be provided to impede outward displacement of a pressure relief blow-out plug (not shown) relative to the base 216. More specifically, upon excess pressure within the bottle 212, the reverse-tapered passage 234 may serve to progressively constrict a body of the plug so that the plug is not so easily ejected from, or displaced with respect to, the wall 228 of the base 216. Even more specifically, the fit between the outer diameter of the plug body and the inner diameter of the tapered pressure relief passage 234 becomes progressively tighter as the plug body moves through the passage 234 and then eventually clears the passage 234. Accordingly, this configuration may render the plug more difficult to be removed from the bottle 212, and also may promote more consistency in the particular overpressure condition within the bottle 212 that is desired to displace or eject the plug. The more consistent overpressure condition may be desirable when seeking to avoid plug displacement or ejection when there is a transient spike in overpressure in the bottle 212 and, instead, promote plug displacement or ejection only during a relatively persistent overpressure condition in the bottle 212.

The tapers of the tapered and reverse-tapered pressure relief passages 134, 234 include circumferential passage surfaces 136, 236 that may have straight tapers, as in the illustrated embodiments, and that may be provided according to a cone angle between 1 and 20 degrees, including all ranges, sub-ranges, endpoints, and values in that range. More specifically, the cone angle may be between 1 and 5 degrees, including all ranges, sub-ranges, endpoints, and values in that range. In other embodiments, the taper(s) instead could be of excurvate and/or incurvate shape, or instead could be partly straight and partly excurvate and/or incurvate. In any event, the tapered passage 134 widens or increases in size along an axially outward direction, and the reverse-tapered passage 234 narrows or decreases in size along an axially outward direction. And, although not separately illustrated, outer circumferential peripheries of bodies of pressure relief blow-out plugs for the passages 134, 234 may be of cylindrical shape, or may be of tapered or reverse-tapered shape to correspond with and contact the respective pressure relief passages 134, 234, or may be of any other shape suitable to facilitate plugging of the respective passages 134, 234.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method comprising:

providing a glass container that comprises a base and a body extending away from the base, the base of the glass container including a wall that has an interior surface and an exterior surface, and wherein the wall defines a pressure relief passage extending between the interior and exterior surfaces of the wall; and inserting a pressure relief blow out plug into the pressure relief passage to seal the passage, the pressure relief blow out plug comprising a plug body, a first inboard flange extending radially outwardly from the plug body, a stem, and a second inboard flange extending radially outwardly from the plug body and being spaced apart from the first inboard flange by the stem, wherein the first inboard flange includes a first outboard sealing surface that provides an axial seal against the interior surface of the wall of the base of the glass container, and wherein the stem extends longitudinally away from the first inboard flange within the glass container to the second inboard flange, the second inboard flange including a circumferentially interrupted outboard facing retention portion that defines vent gaps.

2. The method set forth in claim 1, further comprising:

introducing a liquid into the glass container after inserting the pressure relief blow out plug into the pressure relief passage; and internally pressuring the glass container.

3. The method set forth in claim 1, wherein the glass container further includes a shoulder extending away from the body and a neck extending away from the shoulder, the neck of the container terminating in a neck finish having an open mouth.

4. The method set forth in claim 1, wherein the pressure relief passage is defined by a circumferential passage surface of the wall.

5. The method set forth in claim 4, wherein the pressure relief passage is tapered such that a diameter of the passage increases along an axial direction from the interior surface of the wall to the exterior surface of the wall.

6. The method set forth in claim 4, wherein the pressure relief passage is reverse tapered such that a diameter of the passage decreases along an axial direction from the interior surface of the wall to the exterior surface of the wall.

7. The method set forth in claim 4, wherein the pressure relief passage is of straight cylindrical shape.

8. The method set forth in claim 1, wherein the plug body of the pressure relief blow out plug further includes at least one external rib disposed within the pressure relief passage and in contact with a circumferential passage surface defined by the wall of the base of the container.

9. The method set forth in claim 1, wherein the pressure relief blow out plug further includes a head positioned exterior to the glass container and which contacts the exterior surface of the wall of the base of the glass container.

10. The method set forth in claim 1, wherein the glass container has a longitudinal axis extending centrally through the base of the glass container, and wherein the pressure relief passage axis has a longitudinal passage axis that is colinear with the longitudinal axis of the glass container.

11. A method comprising:

providing a glass container that comprises a base and a body extending away from the base, the base of the glass container including a wall that has an interior surface and an exterior surface, and wherein the wall defines a pressure relief passage extending between the interior and exterior surfaces of the wall; and inserting a pressure relief blow out plug into the pressure relief passage to seal the passage, the pressure relief blow out plug comprising a plug body, a first inboard flange extending radially outwardly from the plug body, a stem, and a second inboard flange extending radially outwardly from the plug body and being spaced apart from the first inboard flange within the glass container by the stem, wherein the first inboard flange includes a first outboard sealing surface that provides an axial seal against the interior surface of the wall of the base of the glass container, and wherein the second inboard flange includes an outboard facing retention portion having a plurality of bosses that extend axially toward the first inboard flange and are circumferentially spaced apart by vent gaps.

12. The method set forth in claim 11, wherein the plug body of the pressure relief blow out plug further includes at least one external rib disposed within the pressure relief passage and in contact with a circumferential passage surface defined by the wall of the base of the container.

13. The method set forth in claim 11, wherein the pressure relief blow out plug further includes a head positioned exterior to the glass container and which contacts the exterior surface of the wall of the base of the glass container.

14. The method set forth in claim 11, further comprising:

introducing a liquid into the glass container after inserting the pressure relief blow out plug into the pressure relief passage; and internally pressuring the glass container to a pressure below a predetermined threshold pressure at which the pressure relief blow out plug is displaced through the pressure relief passage to bring the outboard facing retention portion of the second inboard flange into contact with the interior surface of the wall of the base of the glass container.

15. The method set forth in claim 11, wherein the glass container further includes a shoulder extending away from the body and a neck extending away from the shoulder, the neck of the container terminating in a neck finish having an open mouth.

* * * * *